March 19, 1968 Y. J. GREENBERG 3,373,950

REEL DRIVE ARRANGEMENTS

Filed Nov. 23, 1964

United States Patent Office 3,373,950

Patented Mar. 19, 1968

3,373,950
REEL DRIVE ARRANGEMENTS

Yale J. Greenberg, Canton, Mass., assignor to Keystone Camera Company, Inc., Boston, Mass., a corporation of Massachusetts Filed Nov. 23, 1964, Ser. No. 412,948
6 Claims. (Cl. 242—55.13)

This invention relates to apparatus for processing flexible record members and more particularly to reel drive structures for flexible record members such as magnetic tape and photographic film for use in such machines.

In tape recorders and motion picture apparatus, two distinct drive speeds are employed for movement of the record member—a substantially uniform speed for information transfer (which is constant in the case of magnetic tape and is intermittent in the case of motion picture film) and a variable speed (usually higher) where the member is to be transferred from one reel to another without information transfer. In such devices separate drive are conventionally provided for both the supply reel and the take-up reel. In apparatus of this type, both from the stand-point of manufacturing cost and facilitating its use by relatively inexperienced people, it is desirable to simplify the drive apparatus with further goals of making it compact and reliable.

Accordingly, it is an object of this invention to provide novel and improved drive arrangements for apparatus that drive record members in an information transfer operation.

In accordance with the invention there is provided in apparatus for moving a record member from one reel to another reel past a transducing station in an information transfer operation, a rotary drive arrangement for driving the record members. This arrangement cooperates with a magazine which houses the two reels. The drive arrangement includes two coaxially disposed drive elements each having a distinct coupling portion. The two drive elements are frictionally connected together so that under no load they rotate as a unit. The coupling portion of each drive element is adapted to engage a cooperating coupling element carried by the magazine and connected to a reel. The two couplings are distinct so that a reel in one position of the magazine is coupled to the frictionally driven member, and the other reel in a second position of the magazine is coupled to the other member. The two drive elements are driven as a unit, and, depending on the manner in which the reel is coupled to one of the drive units, the drive arrangement either drives a reel frictionally so that it may slip in coordination with a uniform speed drive of the record member past the information transfer station or directly, and typically at a higher speed, which may be used for rewind operation.

The coaxial disposition of the two drives and the single linkage to the drive motor greatly simplify the drive system. The magazine and drive structure arrangement enables the record member to be easily handled by the operator of the apparatus, enabling motion at constant speed by a capstan or intermittent drive mechanism in one position and at a higher rewind speed through the direct drive in a second position of the magazine.

Other objects, features and advantages of the invention will be seen as the following description of a preferred embodiment thereof progresses, in conjunction with the drawing, in which.

Figures 1, 2, 3, 4, 5, 6, 7, 8:
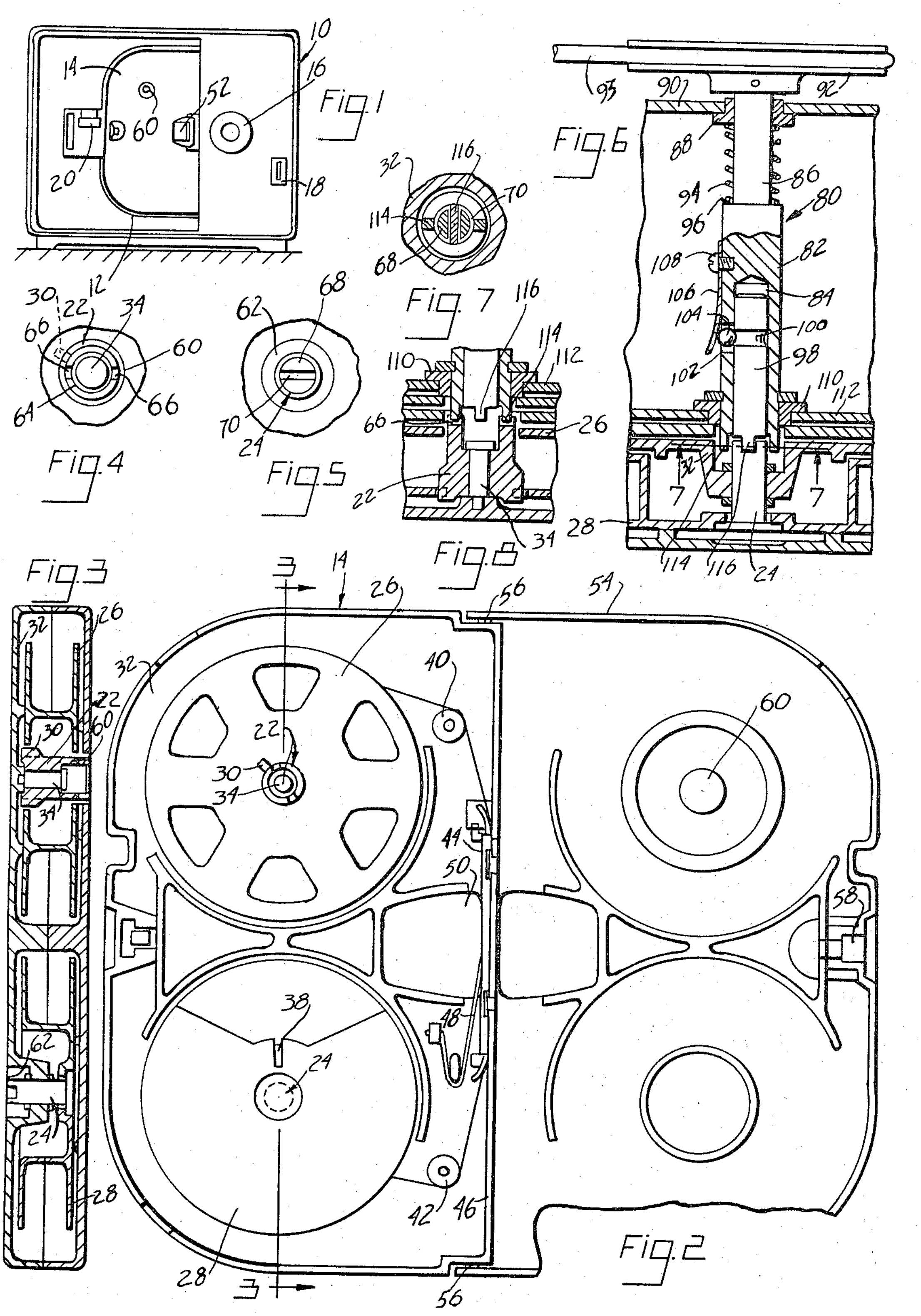
FIG. 1 is a side elevational view of a motion picture projector incorporating apparatus constructed in accordance with the invention.
FIG. 2 is a view of a magazine structure employed with the projector shown in FIG. 1, showing details of the interior construction of the magazine.
FIG. 3 is a sectional view of the magazine taken along the line 3—3 of FIG. 2.
FIG. 4 is an end view of the coupling for the supply reel mounted in the magazine of FIG. 2.
FIG. 5 is an end view of the coupling for the take-up reel shown in FIG. 2.
FIG. 6 is a plan view, partially in section, of the drive arrangement employed in the projector shown in FIG. 1, showing the take-up reel coupled to the drive structure.
FIG. 7 is a sectional view taken along the line 7—7 of FIG. 6 of the relation of the coupled elements.
FIG. 8 is a sectional view, similar to FIG. 6, showing the supply reel coupled to the drive structure.

The projector as shown in FIG. 1 is of the type disclosed in greater detail in the copending patent application Serial No. 412,903, filed November 23, 1964, now abandoned in the name of Benjamin Buckler and entitled "Data Transducer," and assigned to the same assignee as the instant application. That projector includes a casing 10 having in its side wall a recessed compartment 12 for receiving a film magazine 14. Also mounted on the wall structure of the projector is a focusing control 16, a framing control 18, and a start control 20. Additional details of the projector may be had with reference to the above-mentioned copending application.

The magazine 14, as shown in FIG. 2, includes two shafts 22, 24, which are secured within the magazine to receive, respectively, a supply reel 26 and a take-up reel 28. The supply reel may be a conventional reel which holds film as received from the processor and is removably positioned on the stub shaft 22 for rotation therewith as controlled by conventional means through the fin 30. The stub shaft is secured for rotation to the bottom wall member 32 of the magazine by means of stud 34. The take-up reel may be permanently secured within the magazine as mounted on the stub shaft 24 which also is suitably secured for rotation to the base member 32 of the magazine by discs 36. The take-up reel has a slot 38 in which the leading edge of the film may be received and secured in the initial threading operation.

The base member 32 also has mounted on it guide posts 40, 42 which guide the film between the supply reel and take-up reel past an aperture plate 44 which is biased against the front wall 46 of the magazine by means of spring 48. An aperture in the magazine is provided for an information transducer component, in this case a reflector element 52 which protrudes through the aperture 50 and reflects light from a lamp disposed behind the rear wall of compartment 12 through the film and a lens system disposed in front of compartment 12.

The base member 32 also has mounted on it guide base member by suitable hinging means diagrammatically indicated as pins 56 and includes a latch structure 58 so that the cover and base members of the magazine may be secured together to enclose the film.

Each stub shaft mounted on the magazine has a coupling portion formed at one end, the supply reel stub shaft 22 having a coupling portion formed at its upper end (which is visible through aperture 60 in cover 54) and stub shaft 24 having a coupling portion formed at its lower end (visible through aperture 62). These coupling portions are best indicated in FIGS. 4 and 5, respectively. The supply reel coupling structure includes an annular wall member 64 having two aligned slots 66, while the coupling structure for the take-up reel is a solid cylinder 68 having a slot 70 extending thereacross. Other types of coupling arrangements may obviously be employed.

The drive unit which is mounted within the projector casing is shown in FIG. 6. This drive unit 80 includes a main shaft structure 82 which has an axially extending bore 84 in its outer end portion and a reduced diameter portion 86 in its inner end. This reduced diameter portion extends through a bearing 88 mounted in a structural wall 90 of the projector, and on the other side of wall 90 it is secured to a pulley 92 which is driven by belt 93 or other suitable means for rotating the drive unit 80. A spring 94 positioned between the shoulder 96 and the bearing structure 88 acts to bias the drive unit 80 outwardly.

Positioned within bore 84 is an auxiliary shaft member 98 which has an annular groove 100 formed therein. An aperture 102 in the wall of bore 84 is aligned with groove 100 and a ball 104 carried in aperture 102 is biased into engagement with the annular groove 100 by spring 106. Spring 106 is secured to shaft member 82 by screw 108. The outer end of shaft 82 is mounted in a second bearing 110 which is mounted on the wall of the magazine compartment 12.

The outer ends of shaft 82 and auxiliary shaft 98 each have projecting coupling portions 114, 116, respectively, which engage slots 70 and 66, respectively, of the stub shafts 24, 22.

The stub shaft 24 of the take-up reel is shown connected to the drive unit in FIG. 6. This position is for advancing the film past the aperture plate 44 in a projection operation, and the film is principally advanced by the intermittent feed mechanism (a claw) so that the film is moved at a uniform rate. The film, as it is advanced, is taken up through the frictional coupling shaft 24 to pulley 92 through the coupling of shaft 98 to ball 104 as driven by the wall of hole 102 and main drive shaft 82.

When the reel 26 is empty or substantially so as determined by suitable sensing means, the magazine 14 is reversed so that the reel 26 is connected to the drive unit via stub shaft 22 in the position shown in FIG. 8. In this position the tabs 114 engage the slots 66 in the stub shaft 22 in driving relation and reel 26 is then positively driven by shaft 82 for rewinding the film in a direct drive operation.

It will also be noted that the drive shaft unit is resiliently mounted, it being biased forwardly by spring 94 and, should the tabs 114 or 116 and slots 66 or 70 not be properly aligned initially, the resilience of spring 94 allows the drive shaft unit to move inwardly as the magazine 14 is placed in position. Shaft 82 then rotates until the drive couplings are properly aligned at which time the spring 94 moves the drive unit forward to engage the coupling.

While a preferred embodiment of the invention has been shown and described, various modifications will be obvious to those skilled in the art. For example, the groove and ball relationship may be reversed. A variety of coupling mechanisms for connecting the stub shafts to the drive unit will also be obvious to those skilled in the art. Therefore, it is not intended that the invention be limited to the disclosed embodiment or to details thereof, and departures may be made therefrom within the spirit and scope of the invention as defined in the claims.

What is claimed is:

1. Reel drive apparatus for use with transducing equipment of the type in which a flexible record member is moved past a station in an information transfer operation, comprising a casing having a compartment for receiving a magazine that supports two spaced reels for transport of a flexible record member, reel drive means disposed in said casing having a pair of concentric drive elements, means for frictionally coupling said drive elements together, one of said drive elements including coupling means for engaging in driving relation one of said magazine supported reels, and the other of said drive elements including coupling means for engaging in driving relation, the second magazine supported reel so that said record member in a first position of said magazine may be transferred in one direction from one reel to the other by a frictionally coupled drive and in a second position of said magazine may be transferred in the reverse direction by a direct drive.

2. The apparatus as claimed in claim 1 and further including means for biasing said drive elements in an axial direction.

3. A rotary drive mechanism comprising a first shaft having an axially extending bore, a second shaft received within said bore in concentric relation to said first shaft, means to frictionally couple said first and second shafts together, first coupling structure formed on the end of said one shaft for releasable connection to a member to be driven by said one shaft, second coupling coupling structure formed on the end of said second shaft for releasable connection to a member to be driven by said second shaft, and means directly coupled to one of said shafts for rotating said shafts.

4. A rotary drive mechanism comprising a first shaft member having an axially extending bore, a second shaft member received within said bore in concentric relation to said first shaft member, frictional means for coupling said first and second shaft members together, comprising an annular groove in one of said shaft members and a resiliently biased member adapted to engage said groove carried by the other shaft member, first coupling structure formed on the end of said one shaft member for releasable connection to a member to be driven by that shaft, second coupling structure formed on the end of said second shaft member for releasable connection to a member to be driven by said second shaft, resilient biasing means for urging said shaft members in an axial direction, and means directly coupled to one of said shaft members for rotating said shaft members.

5. In a motion picture projector a casing having a compartment for receiving a magazine that supports two spaced reels for transport of a film carried on said reels, reel drive means disposed in said casing having a pair of concentric drive shafts supported for rotation, means for frictionally coupling said drive shafts together, one of said drive shafts including coupling means for engaging in driving relation one of said magazine supported reels, and the other of said drive shafts including coupling means for engaging in driving relation, the second magazine supported reel so that said film in a first position of said magazine may be transferred through said magazine in one direction from one reel to the other by a frictionally coupled drive and in a second position of said magazine may be transferred in the reverse direction by a direct drive.

6. A motion picture projector comprising a housing having a compartment for receiving a film magazine, rotary drive means carried by said housing comprising a first shaft member having an axially extending bore, a second shaft member received within said bore in concentric relation to said first shaft member, frictional means for coupling said first and second shaft members together, comprising an annular groove in one of said shaft members and a resiliently biased member adapted to engage said groove carried by the other shaft member, first coupling structure formed on the end of said one shaft member for releasable connection to a member to be driven by said one shaft, second coupling structure formed on the end of said second shaft member for releasable connection to a member to be driven by said second shaft, resilient biasing means for urging said shaft members in an axial direction, and means directly coupled to one of said shaft members for rotating said shaft members.

References Cited

UNITED STATES PATENTS

| | | | |
|---|---|---|---|
| 2,343,961 | 3/1944 | Del Valle | 242—55.14 |
| 2,360,294 | 10/1944 | Wellman et al. | 242—55.11 |
| 3,061,219 | 10/1962 | Groves | 242—55.12 |

GEORGE F. MAUTZ, *Primary Examiner.*

UNITED STATES PATENT OFFICE

CERTIFICATE OF CORRECTION

Patent No. 3,373,950 March 19, 1968

Yale J. Greenberg

It is certified that error appears in the above identified patent and that said Letters Patent are hereby corrected as shown below:

Column 1, line 21, "drive" should read -- drives --. Column 2, line 41, "The" should read -- That --; line 51, "The base member 32 also has mounted on it guide" should read -- The cover member 54 of the magazine is hinged to the --. Column 4, line 20, cancel "coupling", second occurrence.

Signed and sealed this 2nd day of September 1969.

(SEAL)
Attest:

Edward M. Fletcher, Jr.
Attesting Officer

WILLIAM E. SCHUYLER, JR.
Commissioner of Patents